Oct. 22, 1929.  J. W. LETZERICH  1,732,849

INSECTICIDE DISTRIBUTOR

Filed Feb. 2, 1929

Inventor
J. W. Letzerich
by Carl Miller
Attorney

Patented Oct. 22, 1929

1,732,849

UNITED STATES PATENT OFFICE

JOHANES WILHELM LETZERICH, OF LAGRANGE, TEXAS

INSECTICIDE DISTRIBUTOR

Application filed February 2, 1929. Serial No. 337,065.

My invention relates to a mechanism adapted to distribute powdered substances as for example insecticides or fertilizers upon plants or filled land.

One object of the invention is to provide a device by means of which insecticide may readily be scattered in regulated quantities upon plants and the like. A further object of the invention is the provision of means whereby the same may be readily attached to a cultivator or any other suitable portable farming implement in a simple and efficient manner, and whereby movement of said implement will cause said device to be uniformly actuated.

The preferred form of the invention is illustratively exemplified in the accompanying drawing, in which Figure 1 is a partial top plan view of the device attached to a cultivator or other farming vehicle.

Figure 1:
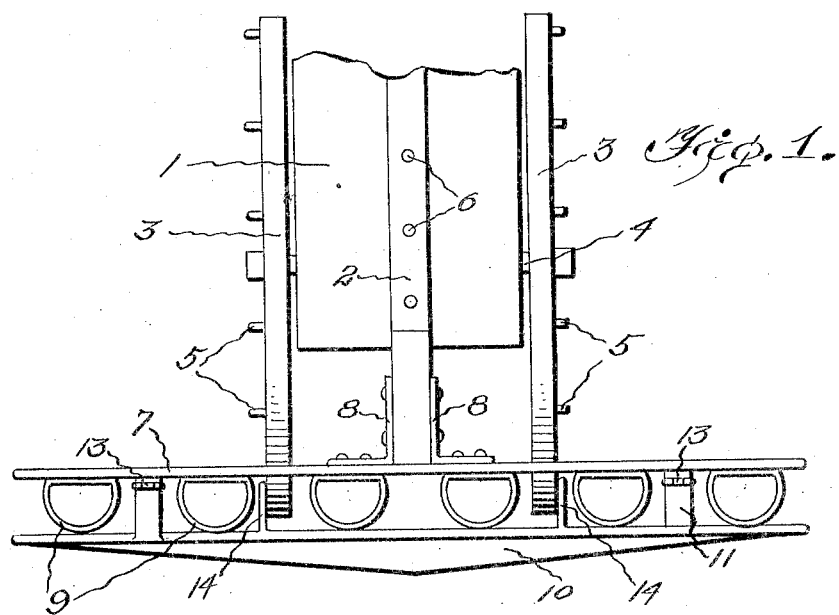
Figure 2:
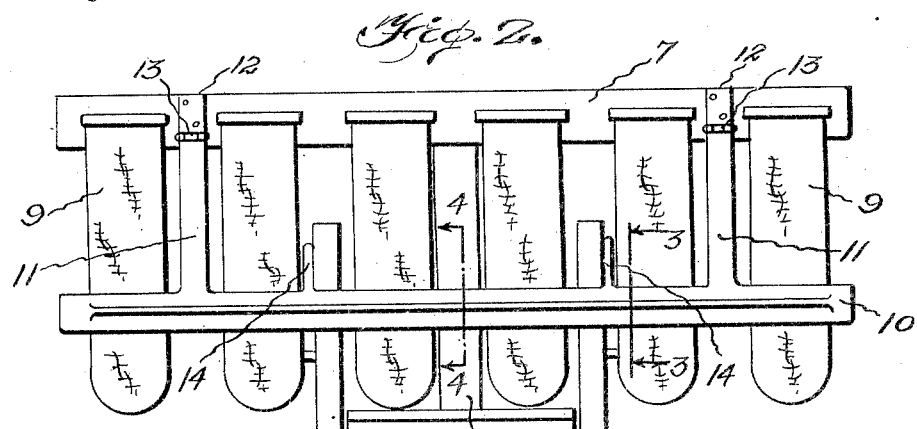
Figure 2 is an elevational front view of the same.
Figure 3:
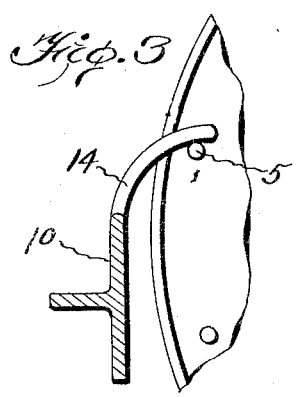
Figure 3 is a detail sectional view taken on the line 3—3 of Figure 2.

Referring to the drawing, 1 denotes the body of a conventional type of farming machine having a forwardly extending tongue 2, and provided with a pair of wheels 3, rotatively mounted on an axle 4. Positioned adjacent the periphery of the wheels 3 and on the outer sides thereof are a plurality of uniformly spaced lugs 5, rigidly secured in any desired manner to the wheels 3, said lugs being provided for a purpose to be hereinafter described.

Figure 4:
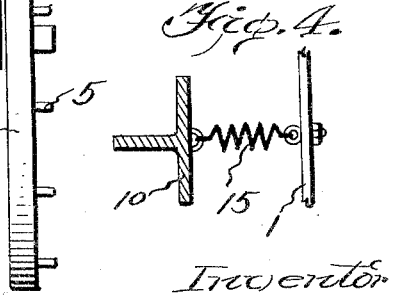
Figure 4 is a detail sectional view taken on the line 4—4 of Figure 2.

A tongue 2 is securely fastened to the body 1 by means of rivets or bolts 6. A cross bar 7 is fastened in abutting relation to the tongue 2 at its forwardly extending free end by means of the brackets 8, said cross bar having secured thereto in any desired manner a plurality of depending containers or bags 9 in which the insecticide is placed, said containers or bags being preferably made of fabric having a more or less open weave so that the insecticide may be forced to exude therefrom. A rocker bar 10 having upwardly extending arms 11 is pivotally connected to the cross bar 7 as at 12, by means of the hinges 13, said rocker bar contacting the outer sides of the fabric containers 9. Between the arms 11 on the rocker bar 10 and in alignment with the studs 5 on the wheels 3, are mounted a pair of upwardly curved contact bars 14, said contact bars 14 being rigidly secured in any desired manner to the upper edge of the rocker bar 10, and adapted to engage the studs 5 on the wheels 3. To keep the contact bars 14 in engagement with the studs 5 and at all times in the path of said studs a tension spring 15 is provided to connect the rear of the rocker bar 10 to any convenient part of the body 1, as clearly shown in Figure 4.

The operation of the device has, to some extent, been indicated in the foregoing description, and the following will make the entire operation of said device clear.

As the machine is moved along between the rows of plants for example, the rotation of the wheels 3 will cause the studs 5 to successively engage the inner curved or cam surface of the contact bars 14, thereby moving the rocker bar 10 outward against the tension of the spring 15. As the studs 5 clear the contact bars 14, the spring 15 will cause the rocker bar 10 to move backwardly into engagement with the fabric containers 9 which are filled with insecticide. This continuous, uniform, forceful engagement of the containers 9 by the rocker bar 10 causes a certain uniform amount of insecticide to be discharged through the fabric containers 9 as they are made to vibrate onto the plants underneath the same as long as the machine is in movement.

In case it is desired not to have any discharge of the insecticide when the machine is in movement, the rocker bar 10 may be swung upward and backward of the containers 9, as is evident from the drawing.

What I claim is:—

1. In a device of the character described, in combination with a portable implement, a cross bar secured at right angles thereto, a plurality of containers, fastened to said cross bar and depending therefrom, a rocker bar, a pair of contact bars on said rocker bar in engagement with actuating means on said implement, resilient means connecting said rocker bar to said implement, whereby said rocker bar is adapted to impart a vibratory movement to said containers, said rocker bar having a pair of upwardly extending arms pivotally connected to said cross bar.

2. In a device of the character described, in combination with a portable implement, a pair of wheels carried thereby, a plurality of studs secured to said wheels at spaced intervals adjacent the periphery thereof and concentric thereto, a forwardly extending tongue on said implement, a cross bar secured at right angles thereto, a plurality of depending fabric containers on said cross bar, and a rocker bar having a pair of contact bars adapted to engage said studs, said fabric containers being positioned between said cross and rocker bars, said rocker bar having a pair of upwardly and rearwardly extending arms pivoted to said cross bar, said contact bars being spaced within said upwardly extending arms and being provided with cam surfaces on their inner sides.

In testimony whereof I affix my signature.

JOHANES WILHELM LETZERICH.